US008437034B2

(12) United States Patent
Waarsing et al.

(10) Patent No.: US 8,437,034 B2
(45) Date of Patent: May 7, 2013

(54) DYNAMICALLY ADAPTED REPROGRAPHIC SYSTEM TO CURRENT OPERATING ENVIRONMENT BASED ON PROBABILISTIC NETWORK

(75) Inventors: Berend J. W. Waarsing, Venlo (NL); Petrus F. A. Van Den Bosch, Eindhoven (NL); Aart J. Hommersom, Velp (NL)

(73) Assignee: OCE Technologies B.V., Venlo (NL)

( * ) Notice: Subject to any disclaimer, the term of this patent is extended or adjusted under 35 U.S.C. 154(b) by 29 days.

(21) Appl. No.: 13/151,351

(22) Filed: Jun. 2, 2011

(65) Prior Publication Data

US 2011/0292409 A1 Dec. 1, 2011

Related U.S. Application Data

(63) Continuation of application No. PCT/EP2009/066348, filed on Dec. 3, 2009.

(60) Provisional application No. 61/119,591, filed on Dec. 3, 2008.

(51) Int. Cl.
*G06K 15/00* (2006.01)
*G06F 3/00* (2006.01)

(52) U.S. Cl.
USPC ........................................... 358/1.5; 358/1.14

(58) Field of Classification Search ................... 358/1.1, 358/1.8, 1.9, 1.12, 1.14, 1.15, 1.5; 382/112; 700/79–82; 714/23, 25, 30; 399/8, 9, 15, 399/18–20
See application file for complete search history.

(56) References Cited

U.S. PATENT DOCUMENTS 5,683,605 A 11/1997 Matsuoka
6,665,425 B1 12/2003 Sampath et al.
7,904,398 B1 * 3/2011 Repici ............................ 706/15
2005/0262394 A1 11/2005 Yasukawa et al.
2008/0209026 A1 * 8/2008 Qi et al. ........................ 709/223
2011/0054853 A1 * 3/2011 Asadi et al. ....................... 703/2

FOREIGN PATENT DOCUMENTS

EP 1 847 887 A2 10/2007

* cited by examiner

*Primary Examiner* — Gabriel Garcia
(74) *Attorney, Agent, or Firm* — Birch, Stewart, Kolasch & Birch, LLP

(57) ABSTRACT

A probabilistic network, in particular a Bayesion network, is used for control of a printing system in order to realize an adaptable printing system. A reprographic system, includes at least one sensor, providing a sensor signal; at least one actuator, responsive to an actuator signal; and a control unit for generating the actuator signal for the at least one actuator in dependence on the sensor signal of the at least one sensor. The control unit includes a signal processing module configured to generate the actuator signal based on at least one sensor signal with involvement of a probabilistic network.

7 Claims, 10 Drawing Sheets

DYNAMICALLY ADAPTED REPROGRAPHIC SYSTEM TO CURRENT OPERATING ENVIRONMENT BASED ON PROBABILISTIC NETWORK

CROSS-REFERENCE TO RELATED APPLICATIONS

This application is a Continuation of copending PCT International Application No. PCT/EP2009/066348 filed on Dec. 3, 2009, which designated the United States, and on which priority is claimed under 35 U.S.C. §120. This application also claims priority under 35 U.S.C. §119(e) on U.S. Provisional Application No. 61/119,591, filed on Dec. 3, 2008. The entire contents of each of the above documents is hereby incorporated by reference into the present application.

BACKGROUND OF THE INVENTION

1. Field of the Invention

The present invention relates to a reprographic system comprising at least one sensor, providing a sensor signal, at least one actuator, responsive to an actuator signal, and a control unit for generating the actuator signal for the at least one actuator in dependence on the sensor signal of the at least one sensor 2. Description of Background Art In many cases, complex systems such as reprographic systems are required to make trade-offs between important characteristics of the system such as warm-up time, speed, and power consumption. Most of the time these characteristics, further to be indicated as "system characteristics," are established when the system is designed. However such trade-offs heavily depend on the environment where the reprographic system eventually will be used. Therefore, it is desirable that the control of the system should adapt the system dynamically. Failure to respond adequately to changing environments might result in the occurrence of faults.

Nowadays, current controllers for reprographic machines are not able to adapt to various circumstances. Most of the time, another controller for that circumstance is needed to cope with other circumstances.

Adaptive control as such is known in the art. In this respect, adaptability is defined as a dynamic in-product trade-off between characteristics of the system at system level.

Several approaches to realize adaptive control exist. According to a first approach, Model Reference Adaptive Control (MRAC) uses a reference model that reflects the desired behavior of the system. On the basis of the output of the reference model and the observations, the controller is tuned. A second approach considers a type of adaptive controllers, so called self-tuning controllers (STC), which estimate the correct parameters of the system based on observations and tunes the control accordingly. In the last few decades, techniques from the area of artificial intelligence (AI), such as rule-based systems, fuzzy logic, neural networks, evolutionary algorithms, etc. have been used in order to predict the right control parameters. A drawback of some of these techniques, such as neural networks, is that such techniques do not provide any insight in why the machine changes its behavior. This is because such models are 'black-box' models, which make the diagnostics and explanation of the behavior of a machine cumbersome. Furthermore, rules of fuzzy logic sentences are difficult to obtain and require extensive testing in order to handle all the relevant situations.

It is desirable to be able to realize a controller for a reprographic machine that is adaptive.

SUMMARY OF THE INVENTION

In order to overcome the problems of the background art, a reprographic system according to the present invention is improved in that the control unit comprises a signal processing module for generating the actuator signal based on at least one sensor signal with involvement of a probabilistic network.

In the case of printing, system-wide qualities include the distribution of power over various parts of the printer, the speed of printing, the energy usage, etc. The inventors found out that there are two characteristics of such problems. First, decisions are typically required at a low frequency, i.e., it is not necessary and even undesirable to change the speed or energy usage many times per second. Second, there is a lot of uncertainty involved when making decisions, in particular about the environment and the state of the machine, but also about the exact dynamics of the system. Probabilistic reasoning approaches such as Bayesian networks seem therefore appropriate.

The behavior of system components and their relationships can be expressed using graphical probabilistic models that succinctly represent joint probability distributions. With relatively simple and understandable models, it becomes possible to reason about component observations, actions and their relations.

The present invention is related to the use of probabilistic estimators for machine control, in particular for engine control for a printer. This is done by setting up a probabilistic model, training the model with realistic data and using the model for control.

Usage of these kind of models is advantageous, since it allows to derive control rules in a probabilistic manner: control as close to a certain value as possible, or control such that the control value crosses in less than x % a certain threshold. It provides a control that by its nature is able to adapt to various circumstances.

In a next embodiment, the probabilistic network is a Bayesian network.

Bayesian networks have been around for a while, and have seen a remarkable rise in their popularity within the scientific community during the past decade. Researchers from various application areas such as psychology, biomedicine and finance have applied these techniques successfully. In the area of control engineering, little research has been done in order to apply these techniques. We believe that these techniques may be useful when system-wide decisions have to be made during runtime, e.g., when the system has to dynamically adapt itself to the environment. Often, it is not feasible to explicitly model the underlying physical model of the complete system, but a model might be learned from data. Controllers based on Bayesian networks have not been investigated extensively.

According to the present invention, Bayesian networks are used to tune parameters of controllers of the system, which is applied to an adaptive control of a part of a printing system.

One advantage of Bayesian networks is that it contains a qualitative part, which can be constructed using expert knowledge, i.e. it is understandable. Moreover, the quantitative part of a Bayesian network can be learned from data, which makes it possible to calculate the desired control signal. Also, the availability of probabilities makes it possible to control the system in such a way that truly undesired states can be avoided with high probability. Productivity improves compared to rule-based systems. Finally, the logic of the controller you get for free.

Applications demonstrated here are in the field of controller stability and robustness, but it can also be used for environment and state recognizers.

Difference with previous stochastic approaches is that there is an underlying domain model, which is understandable. This is particularly important if we would like to use or re-use these models for, for example, diagnostic purposes.

In a next particular embodiment of a reprographic system according to the present invention, the sensor is a temperature sensor for sensing the temperature of a copy sheet and the actuator is a heating component.

For the types of printing systems under consideration, various temperatures during the printing process play an important role. Low-level controllers make sure that the temperature of measurable components can be kept on setpoint. However, due to design and financial considerations, it is not possible to place sensors at all places of interest. According to an aspect of the present invention, by making use of a probabilistic network, it is possible to estimate the right control parameters for a heating component when only one or a few sensors for measuring the temperature of media (paper) that has passed this heating component are available. Clearly, this cannot be done without taking into account uncertainty, such as the environmental temperature, the speed, and the type of paper. In this case, we focus on the latter aspect.

An example of an application for the present invention is the control of paper temperature. When a model is trained with different paper weights and situations, you can derive rules such that your paper will always (e.g. 99% of the cases) be warmer than, e.g. 80° C. Because the behavior of the system is learned, the controller will adapt itself: when the paper is very light weight, it will make sure that the paper temperature is higher such that it can cope with a certain switch to heavy paper, while, when the paper is heavy, it will use less margin. This feature is very effective in minimizing the needed latitude.

In another embodiment of the reprographic system according to the invention, where the system is a printing system, having a printing speed, the sensor is a sensor for determining the power available and the actuator is an actuator for controlling the requested power by controlling the printing speed.

The productivity of printers is limited to the amount of power available, in particular in environments which depend on weak mains. If there is insufficient power available, then setpoints cannot be reached, which causes bad print quality. To overcome this problem, it is either possible to decide to print at lower speeds or to adapt to the available power dynamically. In the section, we explore the latter option by a dynamic speed adjustment using a Bayesian network.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will now be explained further with reference to the accompanying drawings, wherein.

DETAILED DESCRIPTION OF THE INVENTION

Figure 1:
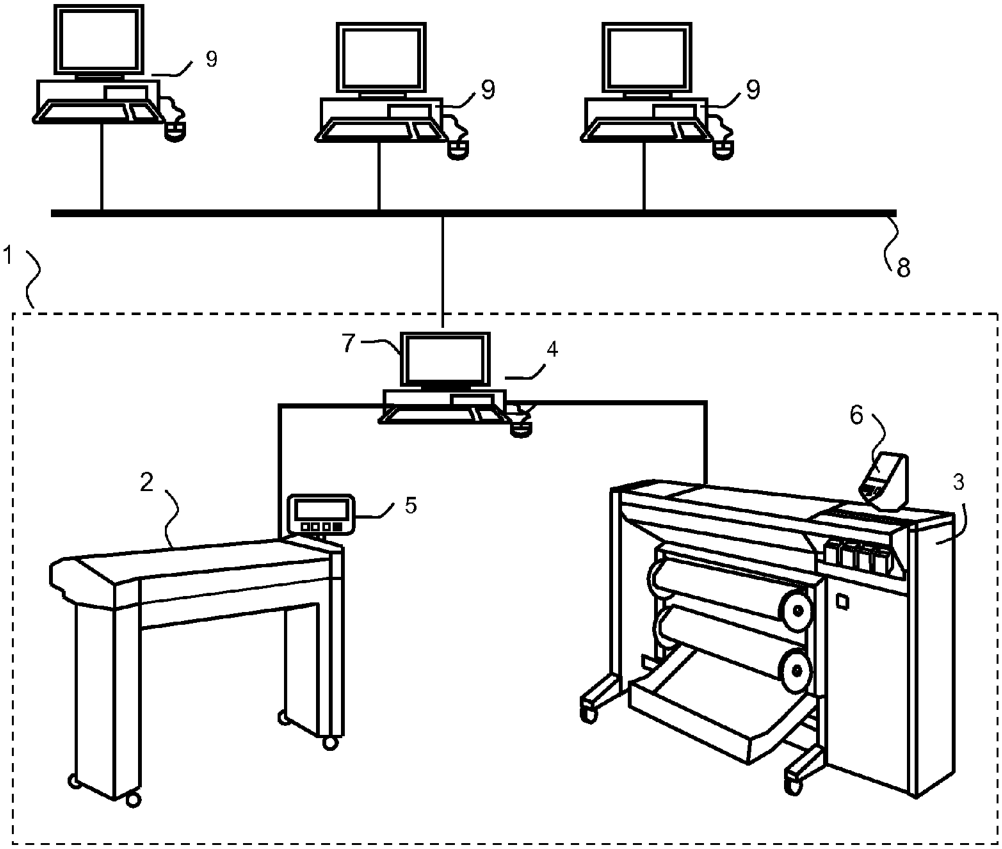
FIG. 1 shows a reprographic system.

FIG. 1 is a schematic diagram of an environment in which the present invention may be used. The reprographic system 1 as presented here comprises a scanning unit 2, a printing unit 3 and a control unit 4.

The scanning unit 2 is provided for scanning an original color document supported on a support material. The scanning unit is provided with a CCD type color image sensor (i.e. a photoelectric conversion device), which converts the reflected light into electric signals corresponding to the primary colors red (R), green (G) and blue (B). A local user interface panel 5 is provided for starting scan and copy operations.

The printing unit 3 is provided for printing digital images on image supports. The printing unit may use any number of printing techniques. It may be a thermal or piezoelectric inkjet printer, a pen plotter, or a press system based on organic photoconductor technology, for instance. In the example shown in FIG. 1, printing is achieved using an electrophotographic printing process with a transfer belt and a fuse roll. An image is projected on a photosensitive drum, which will be charged accordingly. The image on the drum is provided with toner, and next the image is transferred to a transfer belt and subsequently fused on a paper sheet in a fuse pinch. A local user interface panel 6 is provided with an input mechanism, such as buttons, for selecting a user, a job and for starting a printing operation, etc.

The scanning unit 2 and the printing unit 3 are both connected to the control unit 4. The control unit 4 executes various tasks such as receiving input data from the scanning unit 2, handling and scheduling the submitted data files, controlling the scanning unit 2 and the printing unit 3, and converting image data into printable data, etc. The control unit is provided with a user interface panel 7 for offering the operator an extensive menu of commands for executing tasks and making settings.

Moreover, the control unit is connected to a network 8 so that a number of client computers 9, also connected to the network, may make use of the reprographic system 1.

The reprographic system is depicted in FIG. 1 as three distinct apparatuses: scanner, printer and control unit, however, it is equally possible to combine these three components into one reprographic apparatus.

Figure 2:
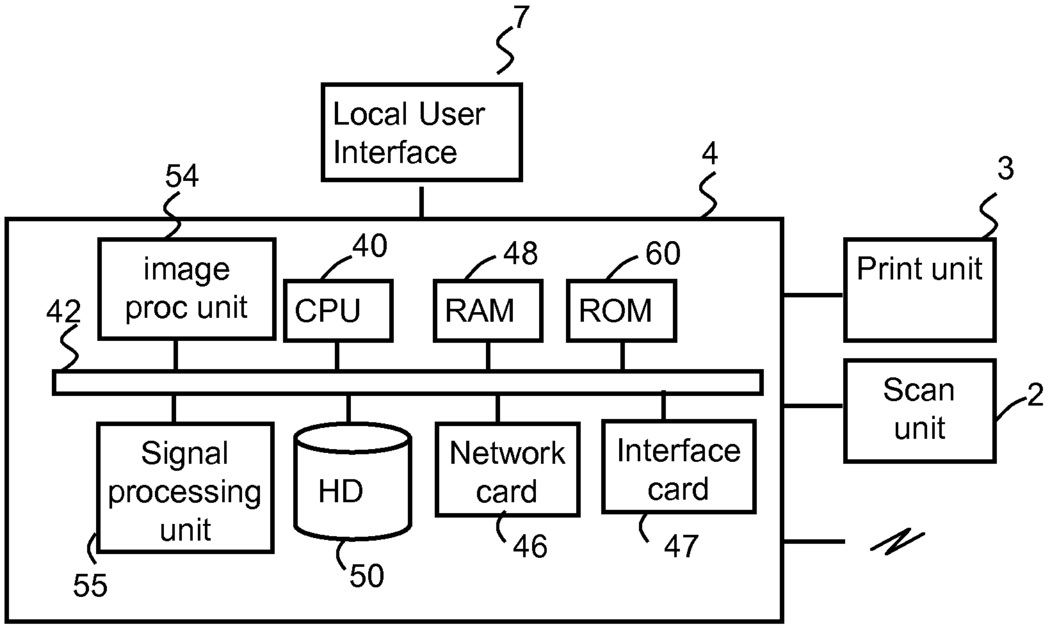
FIG. 2 shows the control unit of the reprographic system.

The control unit is in more detail presented in FIG. 2. As shown in FIG. 2, the control unit 4 of the reprographic system 1 comprises a Central Processing Unit (CPU) 40, a Random Access Memory (RAM) 48, a Read Only Memory (ROM) 60, a network card 46, an interface card 47, a hard disk (HD) 50, an image processing unit 54 (such as a Raster Image Processor or RIP) and a signal processing unit 55. The aforementioned units are interconnected through a bus system 42.

The CPU 40 controls the respective units of the control unit 4, the local user interface 7, scanning unit 2 and the printing unit engine 3, in accordance with control programs stored on the ROM 60 or on the HD 50.

The ROM 60 stores programs and data such as a boot program, a set-up program, various set-up data or the like, which are to be read out and executed by the CPU 40.

The hard disk 50 is an example of a storage unit for storing and saving programs and data, which make the CPU 40 execute a print process to be described later. The hard disk 50 also comprises an area for saving the data of externally submitted print jobs. The programs and data on the HD 50 are read out onto the RAM 48 by the CPU 40 as needed. The RAM 48 has an area for temporarily storing the programs and data read out from the ROM 60 and HD 50 by the CPU 40, and a work area, which is used by the CPU 40 to execute various processes.

Interface card 47 connects the control unit to scanning unit 2 and printing unit 3.

Network card 46 connects the control unit 4 to the network 8 and is designed to provide communication with the workstations 9, and with other devices reachable via the network.

The signal processing unit 55 may be implemented either as a software component of an operating system running on the control unit 52 or as a firmware program executed on the CPU 40.

The internals of the signal processing module will be elaborated in relationship to the description of the embodiments.

Basic modes of operation for the reprographic system are scanning, copying and printing.

With the electric signals corresponding to the primary colors red (R), green (G) and blue (B) obtained during scanning, a digital image is assembled in the form of a raster image file. A raster image file is generally defined to be a rectangular array of regularly sampled values, known as pixels. Each pixel (picture element) has one or more numbers associated with it, generally specifying a color, which the pixel should be displayed in. The representation of an image may have each pixel specified by three 8 bit (24 bits total) colorimetric values (ranging from 0-255) defining the amount of R, G, and B, respectively, in each pixel. In the right proportions, R, G, and B can be combined to form black, white, 254 shades of grey, and a vast array of colors (about 16 million). The digital image obtained by the scanning unit 2 may be stored on a memory of the controller 6 and be handled according to a copy path, wherein the image is printed by the print engine 4.

Alternatively, the digital image may be transferred from the controller to a client computer 9 (scan-to-file path).

Finally a user of the client computer 9 may decide to print a digital image, which reflects the printing mode of operation of the system.

According to an aspect of the present invention, the signal processing unit that controls system characteristics of the reprographic system uses a Bayesian network to determine actuator signals based on incoming sensor signals.

A Bayesian network B=(X,G, P) consists of a directed acyclic graph G=(V,E) where Visa set of vertices $\{v1, \ldots, vn\}$ and $E \subset V \times V$ is a set of directed arcs; the set X is a set of (discrete) random variables that correspond one-to-one with the vertices of G, i.e., each vertex v corresponds exactly with one random variable Xv; P is a set of conditional probability distributions containing one distribution, P(Xv|Xπc(v)), for each random variable Xϵ2 X, where π (v) is the set of parents of v in the graph G.

A Bayesian network encodes a joint probability distribution over the set of random variables X, which can be calculated by multiplying the conditional probabilities, i.e.,:

$$P(X) = \prod_{v \in V} P(X_v \mid X_{\pi(v)})$$

Bayesian networks can encode various probability distributions. Most often the variables are either all discrete or all continuous. Hybrid Bayesian networks, however, contain both discrete and continuous conditional probability distributions. A commonly used type of hybrid Bayesian network is the conditional linear Gaussian model. Efficient exact and approximate algorithms have been developed to infer probabilities from such networks.

A Bayesian network can be constructed with the help of one or more domain experts. However, building Bayesian networks using expert knowledge, although by now known to be feasible for some domains, can be very tedious and time consuming. Learning a Bayesian network from data is also possible, a task which can be separated into two subtasks: (1) structure learning, i.e., identifying the topology of the network, and (2) parameter learning, i.e., determining the associated joint probability distribution for a given network topology. According to the present invention, we employ parameter learning. This is typically done by computing the maximum likelihood estimates of the parameters, i.e., the conditional probability distributions, associated with the networks structure given data.

A dynamic Bayesian network is a Bayesian network where the vertices of the graph are indexed with (discrete) time slices. Each time slice consists of a static Bayesian network, and the time slices are linked to represent the relationships between states in time.

According to the present invention, the topology of a Bayesian network is established a priori during the design phase of the reprographic apparatus for each characteristic of the apparatus where adaptability is required.

In a next step according to the present invention, parameter learning takes place. For the embodiments presented here, this is also carried out during the design of the apparatus. Heretofore, the targeted hardware is modeled, and this model is used to infer the associated joint probability distribution for the given network topology. It is remarked, however, that this latter step is carried out at runtime when the reprographic system is actually in use.

The topology and the probability distribution data obtained are stored on the hard disk of the control unit, and will be invoked at the moment the signal processing unit is required to act according to the invention.

Next, a first particular embodiment is presented where an optimal setpoint for a heater is generated.

In a probabilistic model, the available power for heating the paper, the temporal properties of heating components, different paper weights, minimum temperature requirements for high quality prints, and the basic process speed, have been related.

Subsequently, this model is applied to construct a controller that regulates setpoints (e.g. of a heater component) on the basis of some observables (e.g. temperatures) and other properties which are unknown (e.g. paper glossiness) but probabilistically related.

This simple approach leads to controllers with some surprising characteristics and features.

As an example, a controller target can be either stated as "keep the temperature as close as possible to a certain value" or as "regulate the temperature such that its probability to decrease to a certain value is less than x %." The second option leads to a kind of smart buffer behavior: for light paper, the temperature is regulated at a higher set point in order to account for the possibility that heavier paper will arrive.

Such behavior can be built into a rule-based controller as well, after the designer has become aware of this fact. In the probabilistic model-based controller, this behavior follows automatically from the system knowledge that is captured in the model itself.

Figure 3:
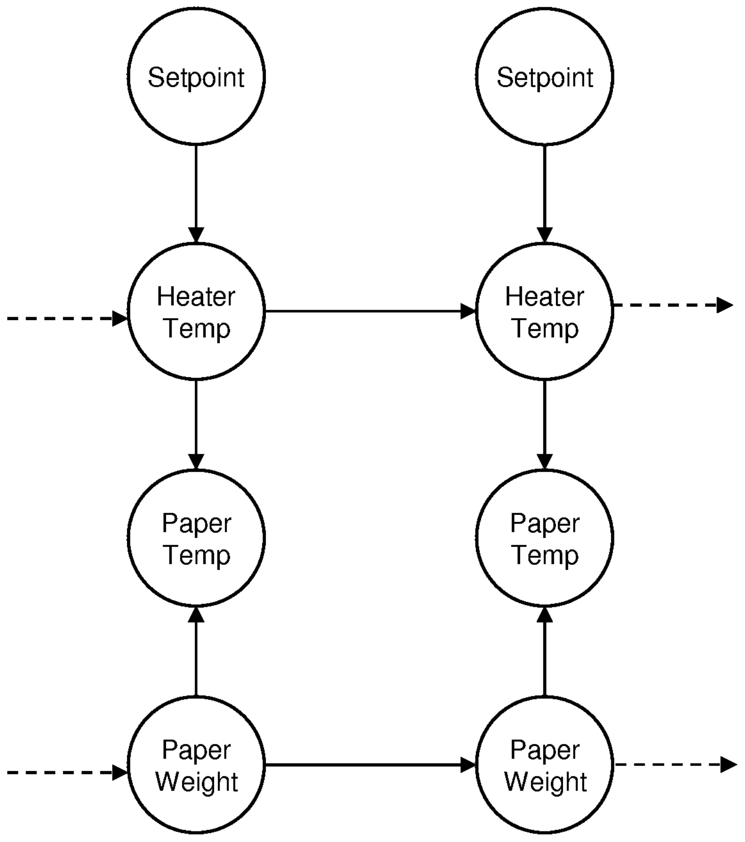
FIG. 3 shows the topology of a first Bayesian network for control of Temperature.
Figure 4:
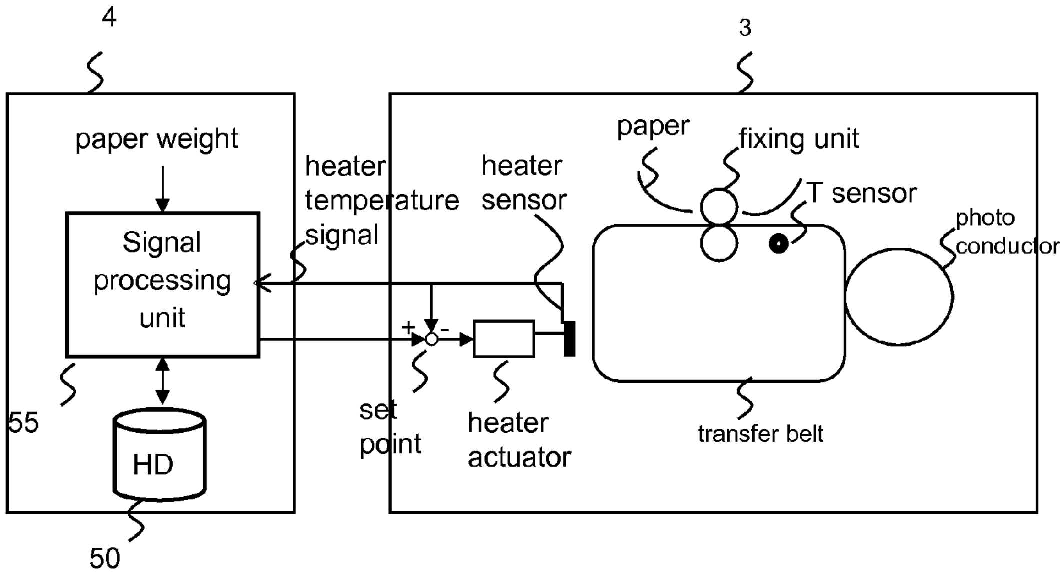
FIG. 4 shows the operating environment for control of Temperature.

The qualitative structure of the domain, and the topology of the network, has been elicited from the domain experts. For the purpose of clarity, we focus on certain relevant parts of the complete network dealing with the specific problem of determining the correct setpoint of the heater. The structure of the domain consisting of two time slices is presented in FIG. 3. FIG. 4 shows the operative environment for this control. The associated random variables for this network have been modeled as discrete variables by discretizing the values to typical values that can be found during simulation. The setpoint variables have a domain size of 12; media (e.g. paper) temperature has a domain size of 16, and we consider three paper types: 80, 120 or 160 grams paper. In order to acquire data and to test the system, a physical model of the system will be created, e.g. by using Simulink. The data that will be generated in this way is used to learn the conditional distributions of the model by calculating the parameters associated to the qualitative structure of the Bayesian network. In the operating environment depicted in FIG. 4, the signal processing unit controls the setpoint for the heater. As input, it uses the temperature of the heater obtained from a sensor at the heater, and paper weight obtained from the job definition of the print job that is actually carried out. The signal processing unit according to the present invention, making use of a Bayesian network, is used to control the setpoint of this controller. For this we consider 2 time slices, one describing the current situation and the next used to reason about the next situation, i.e., we take a joint probability distribution:

$$P(\mathrm{Setpoint}_0, \mathrm{HeaterTemp}_0, \mathrm{PaperTemp}_0, \mathrm{PaperWeight}_0, \mathrm{SetPoint}_1, \mathrm{HeaterTemp}_1, \mathrm{PaperTemp}_1, \mathrm{PaperWeight}_1)$$

The objective is to keep the paper temperature on setpoint. The goal is then to decide the next setpoint, such that the temperature of the paper will be at a setpoint of 66° C., based on the measurement of the temperature T and the current setpoint SP. Specifically, we calculate:

$$SP^* = \underset{SP' \in dom(Setpoint_1)}{\operatorname{argmax}} P(PaperTemp = 66 \mid Setpoint_1 = SP', Setpoint_0 = SP, PaperTemp_0 = T)$$

Due to the fact that we take a simplified Bayesian network, i.e., variables are independent of their history given the immediate history, this may lead to undesired effects. For example, increasing the setpoint of the heater controller will lead to a higher setpoint, but low temperature, as it takes some time for the heater to become effective. The conclusion may be that the setpoint needs to be increased even further for the desired temperature to be reached, i.e., the interpretation of the situation is wrong. There are several solutions for this problem. Thus in an improved embodiment, the probablisitic network is extended to incorporate additional evidence of earlier states. In the alternative, it is possible to sample less, i.e., by waiting for the system to return to a steady state. One simple heuristic that proved to be very successful in this situation is to avoid making decisions when the interpretation is uncertain, i.e., by:

$$\max_{W \in dom(PaperWeight_0)} P(PaperWeight_0 = W \mid Setpoint_0 = SP, PaperTemp_0 = T) < k$$

where k is some tuning constant less than 1.

Figure 5:
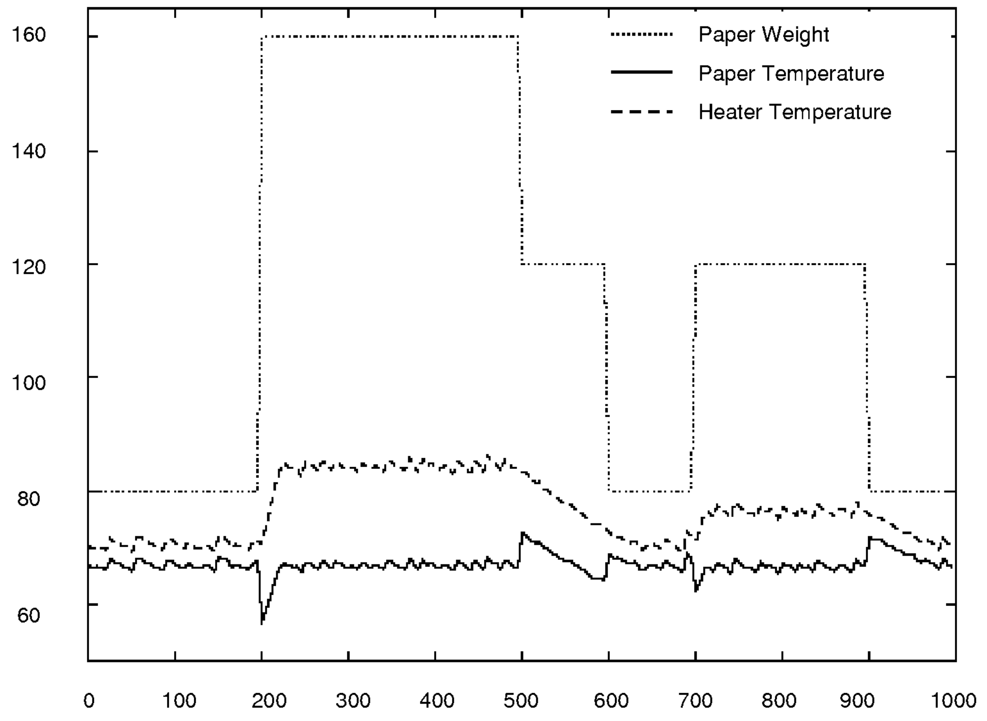
FIG. 5 shows results of the Bayesian controller.

The results of a Bayesian controller are presented in FIG. 5 (with k=0.9). Note that there is some amount of noise of the temperature of the paper, since this noise is not controlled in the adaptive control setting. This noise was added to the model to account for various uncertainties such as measurement errors. Clearly, such noise has no impact on the actual paper temperature.

The embodiment shown is rather straightforward. It is noted that the invention is in particular suited for more complex controllers, where traditional control theory starts to become more difficult. One example we discuss in the next section.

The embodiment presented so far is still limited in that if we try to keep the paper at the minimum temperature, temperatures may drop below this value in certain situations, e.g. when the media changes. As mentioned before, in order to get high quality prints, it is of importance to have a certain amount of heat at any time. This could lead to a system fault. One solution is to put the setpoint at a higher temperature which provides a buffer for the media changes; however, if it is unnecessarily high, energy is lost and may cause problems at other parts of the printing process.

To cater for the above in a further improved embodiment also a lowest temperature is put as a probability constraint on the control signal. In this case, we are interested in the lowest temperature that ensures that we avoid dropping below 66° C. Formally, to decide on the next setpoint, we calculate the minimum SP' such that:

$$\sum_{T \in \{50, \ldots, 64\}} P(PaperTemp_1 = T \mid Setpoint_1 = SP', Setpoint_0 = SP, PaperTemp_0 = T) < 0.01$$

Figure 6:
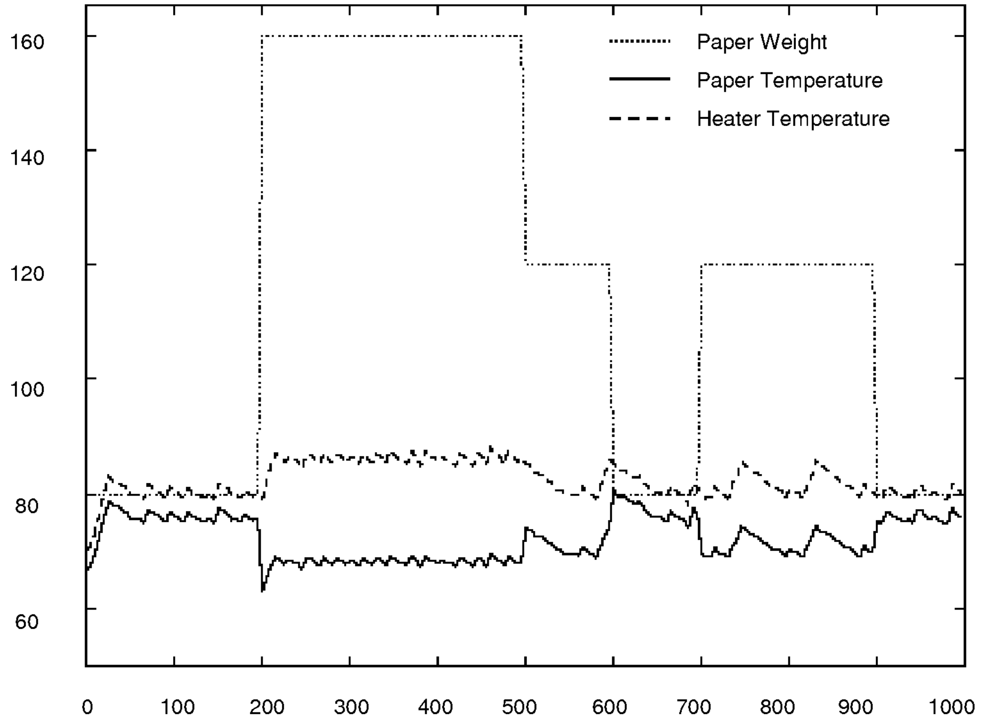
FIG. 6 shows results of an improved Bayesian controller.

The result can be found in FIG. 6. What is interesting here is that the heater temperature is relatively high when the paper weight is lower. This is because the system anticipates on paper that might arrive with a high paper weight, as this high paper weight causes a sudden large drop in temperature. This type of logic could be modeled by any system; however, it is interesting to see here that this is implicit in the probability distribution that has been learned from data.

The effect is that in order to get high quality prints, a certain amount of heat is available at any time.

A next particular embodiment is presented now that aims at optimizing productivity in environments with weak mains.

The productivity of printers is limited to the amount of power available, in particular in environments which depend on weak mains. If there is insufficient power available, then setpoints cannot be reached, which causes bad print quality. To overcome this problem, the embodiment presented implements dynamic speed adjustment using a Bayesian network.

Figure 7:
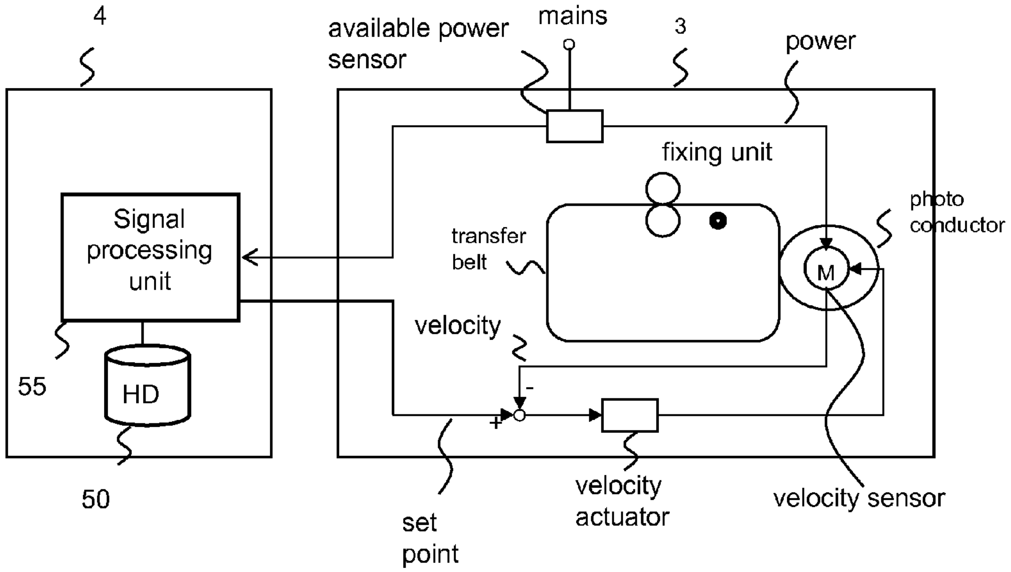
FIG. 7 shows the operating environment for optimizing productivity.

The operating environment for this embodiment is shown in FIG. 7. Shown is a sensor for available power and a sensor for velocity. Motor M drives the photosensitive drum with a velocity v, being the printing speed. The available power is by means of a sensor communicated to the signal processing unit. The requested power is known. This may result in an error. Velocity is controlled to minimize the error. The signal processing unit generates the setpoint for velocity based on the inputs and by making use of a Bayesian network. In this way the requested power is controlled by controlling the printing speed.

Figure 8:
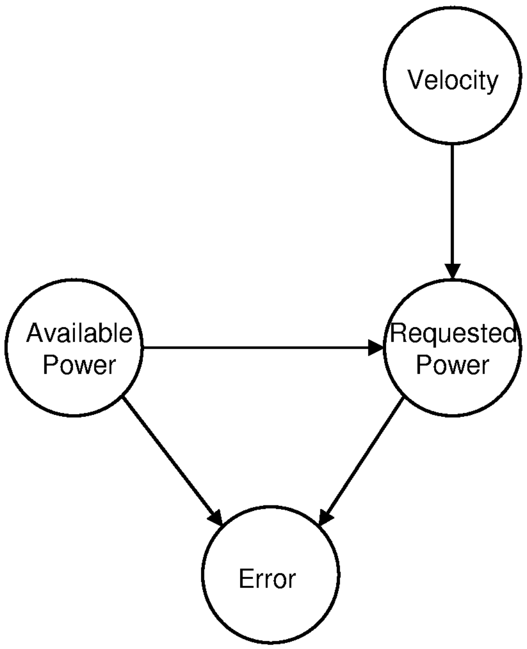
FIG. 8 shows the topology of a second Bayesian network for optimizing productivity.
Figure 9:
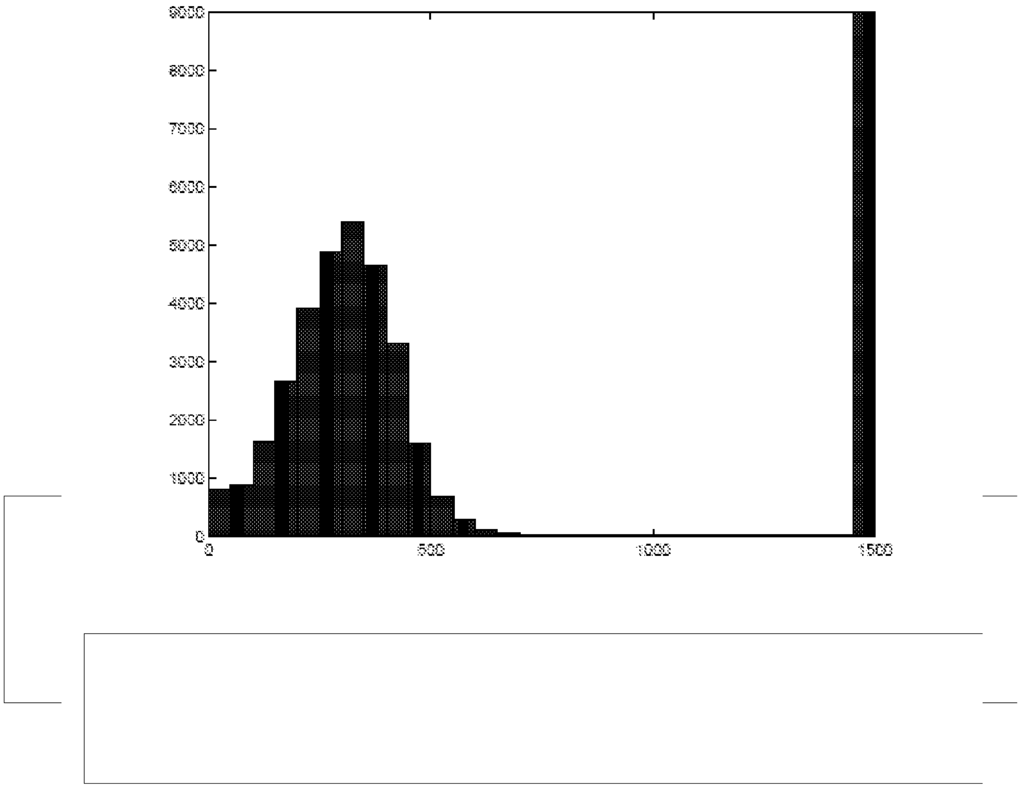
FIG. 9 shows a graph showing distribution of available power.
Figure 10:
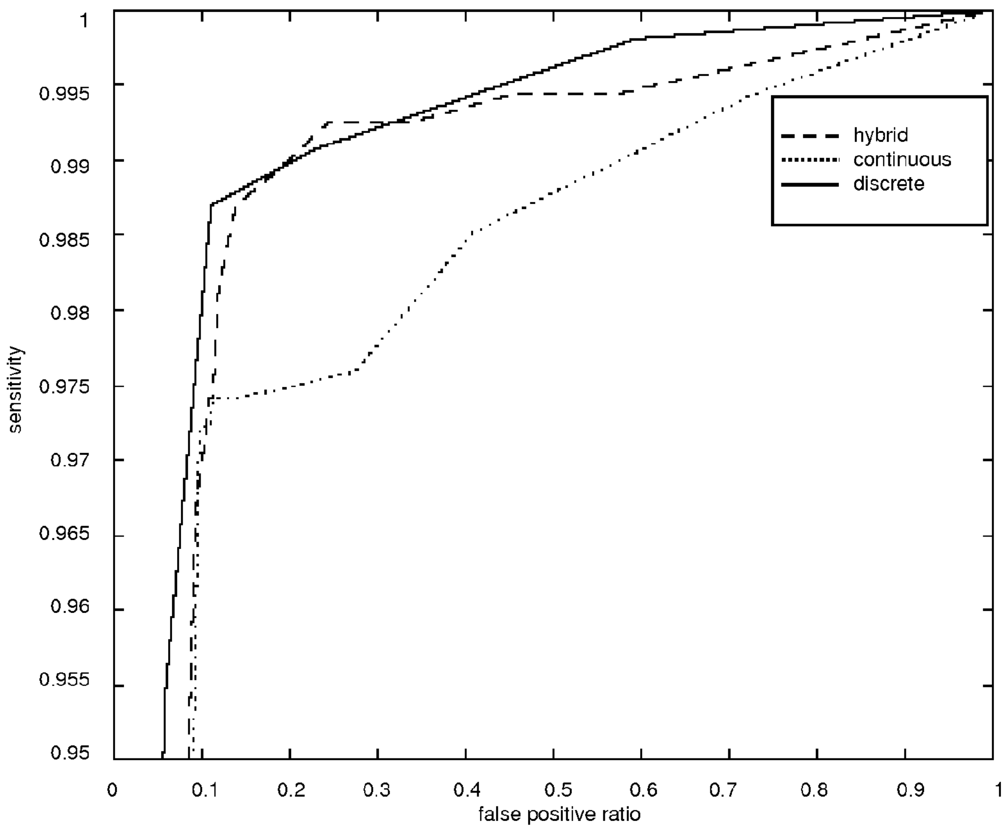
FIG. 10 shows a graph showing curves of three Bayesian networks.

The topology of the Bayesian network on each time slice for this embodiment is shown in FIG. 8. The requested power available is an observable variable that depends on lower-level controllers that aim at maintaining the right setpoint for reaching a good print quality. The error variable is only observable in laboratory situations, and models the deviation of the actual temperature from the ideal temperature. If this error variable exceeds a certain threshold, then the print quality will be below a certain norm. Both velocity and available power influence the power that is or can be requested by the low-level controllers. Furthermore, the combination of the available power and the requested power is a good predictor of the error according to the domain experts. In the embodiment presented, two time slices are used with the interconnections between the available power, which models that the power supply on different time slices is not independent, and requested power, which models the state of the machine that influences the requested power. In order to choose the family of distributions, the variables are modeled as Gaussian variables. This is reasonable as most variables are normally distributed, except for the available power (see FIG. 9). Fitting a Gaussian random variable to such a distribution will typically lead to insufficient performance. However, it can be seen as a sum of two Gaussian distributions, one around 400 W and a second around 1500 W with a small variance. Such a distribution can be modeled using a hybrid network. One of the main reasoning tasks of the network is to estimate the error given a certain velocity and certain observations. We could consider this a classification performance, i.e., the print quality is bad or good. This provides means to compare different models and see how well it performs at distinguishing between these two possibilities. A standard way to visualize and quantify this is by means of an ROC curve, which shows the relation between the false positive ratio and the true positive ratio (sensitivity). The area under the curve is a measure for its classification performance. We have compared three models, i.e., a discrete model, a fully continuous model and a hybrid model for modeling the distribution of the requested power with two Gaussians. The classification performance is then outlined in FIG. 10. As expected, the fully continuous model performs worse, whereas the hybrid and discrete shows a similar trend. The advantage of the discrete version is that the probability distribution can easily be inspected and it has no underlying assumptions about the distribution, which makes it easier to use in practice. The hybrid version however allows for more efficient computation as we need a large number of discrete to describe the conditional distributions. For this reason, we used the latter in experiments.

In the simulation, the available power is modeled as a random variable with a mean of 600 W and a standard deviation of 200 W. The available power given to the system is sampled from this variable every 100 seconds. Given the information about the power available and requested, i.e., the error information is not available during runtime, the marginal probability distribution of the error in the next time slice is computed. This error is a Gaussian random variable with mean $\mu$ and standard deviation $\sigma$. For Gaussian variables, more than 99.7% of the real value of the error will be within three standard deviations of the mean. Given a maximum error that we allow $\tau$—in this case we chose 5° C.—we compute the highest velocity v such that the marginal probability distribution of P(Error_1) is such that $\mu+3\sigma<\tau$, which implies that, $P(\text{Error\_1}<\tau)>99.7\%$.

It is advantageous that the logic underlying the controller does not have to be designed. Which would be a cumbersome task when adaptability is needed. According to an aspect of the present invention, what is required is a qualitative model, data and a probabilistic criterion that can be inferred.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A reprographic system, comprising:

at least one sensor, providing a sensor signal;

at least one actuator, responsive to an actuator signal; and a control unit for generating the actuator signal for the at least one actuator in dependence on the sensor signal of the at least one sensor, said control unit comprising a signal processing module configured to generate, during runtime, the actuator signal based on at least one sensor signal with involvement of a probabilistic network, wherein the actuator signal dynamically adapts the system to a current operating environment thereby keeping the system operating in the current operating environment.

2. The system according to claim 1, where the probabilistic network is a Bayesian network.

3. The system according to claim 1, where the system is a printing system, the sensor is a temperature sensor for sensing the temperature of a heating component, and the actuator is a heating component.

4. The system according to claim 1, where the system is a printing system, having a printing speed, the sensor is a sensor for determining the power available, and the actuator is an actuator for controlling the requested power by controlling the printing speed.

5. The system according to claim 2, further comprising a storage device configured to store a topology of a Bayesian network, the topology comprising vertices and edges, the storage device being configured to store probability distributions coupled one to one with the vertices.

6. The system according to claim 3, further comprising a storage device configured to store a topology of a Bayesian network, the topology comprising vertices and edges, the storage device being configured to store probability distributions coupled one to one with the vertices.

7. The system according to claim 4, further comprising a storage device configured to store a topology of a Bayesian network, the topology comprising vertices and edges, the storage device being configured to store probability distributions coupled one to one with the vertices.

* * * * *